United States Patent

[11] 3,573,800

[72] Inventors Thomas E. Gardner
Sunnyvale, Calif.;
Jack E. Steffens, West Caldwell, N.J.
[21] Appl. No. 775,667
[22] Filed Nov. 14, 1968
[45] Patented Apr. 6, 1971
[73] Assignee United Aircraft Corporation
East Hartford, Conn.

[54] SERIAL ANALOG TO DIGITAL CONVERTER
16 Claims, 9 Drawing Figs.

[52] U.S. Cl. 340/347AD, 235/154
[51] Int. Cl. H03k 13/02
[50] Field of Search 340/347; 235/154

[56] References Cited
UNITED STATES PATENTS

| | | | |
|---|---|---|---|
| 3,447,147 | 5/1969 | Deregnacourt | 340/347 |
| 3,441,723 | 4/1969 | Reidel | 235/154 |
| 3,345,630 | 10/1967 | Tada | 340/347 |
| 3,414,818 | 12/1968 | Reidel | 340/347 |

*Primary Examiner*—Thomas A. Robinson
*Assistant Examiner*—Jeremiah Glassman
*Attorney*—Melvin Pearson Williams

ABSTRACT: A serial analog-to-digital converter, utilizing well-known successive approximation techniques, employs a shift register with a variable shift control and selective high order data insertion to eliminate the need for timing registers and complex logic while providing low to high order serial data output capability in a simple configuration.

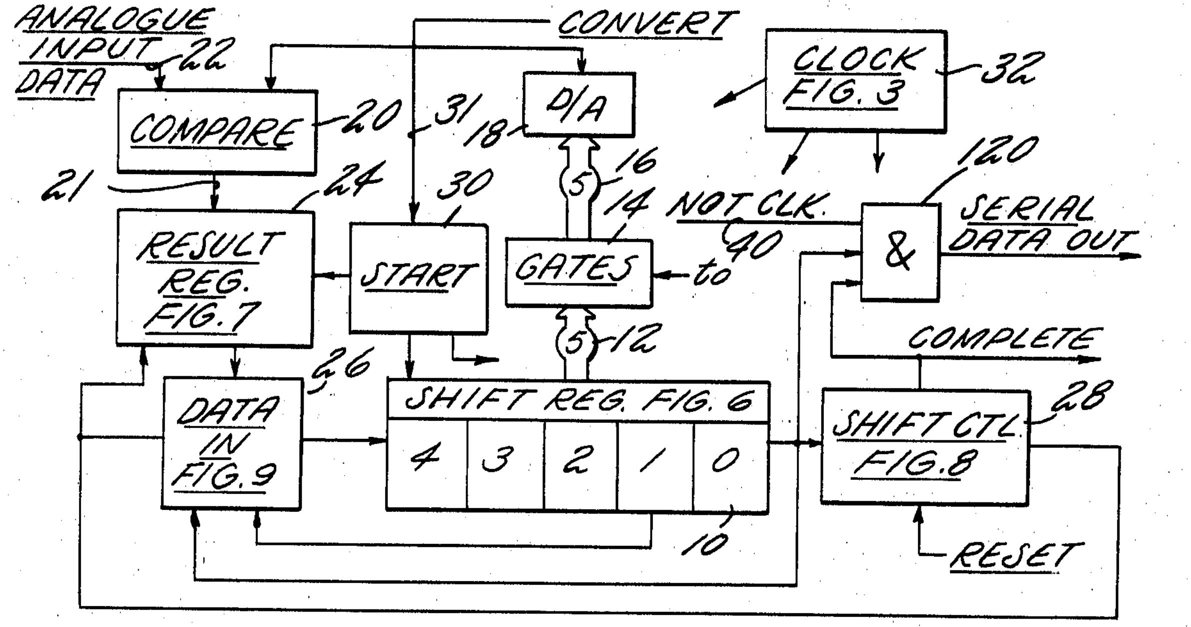
FIG. 1 SYSTEM
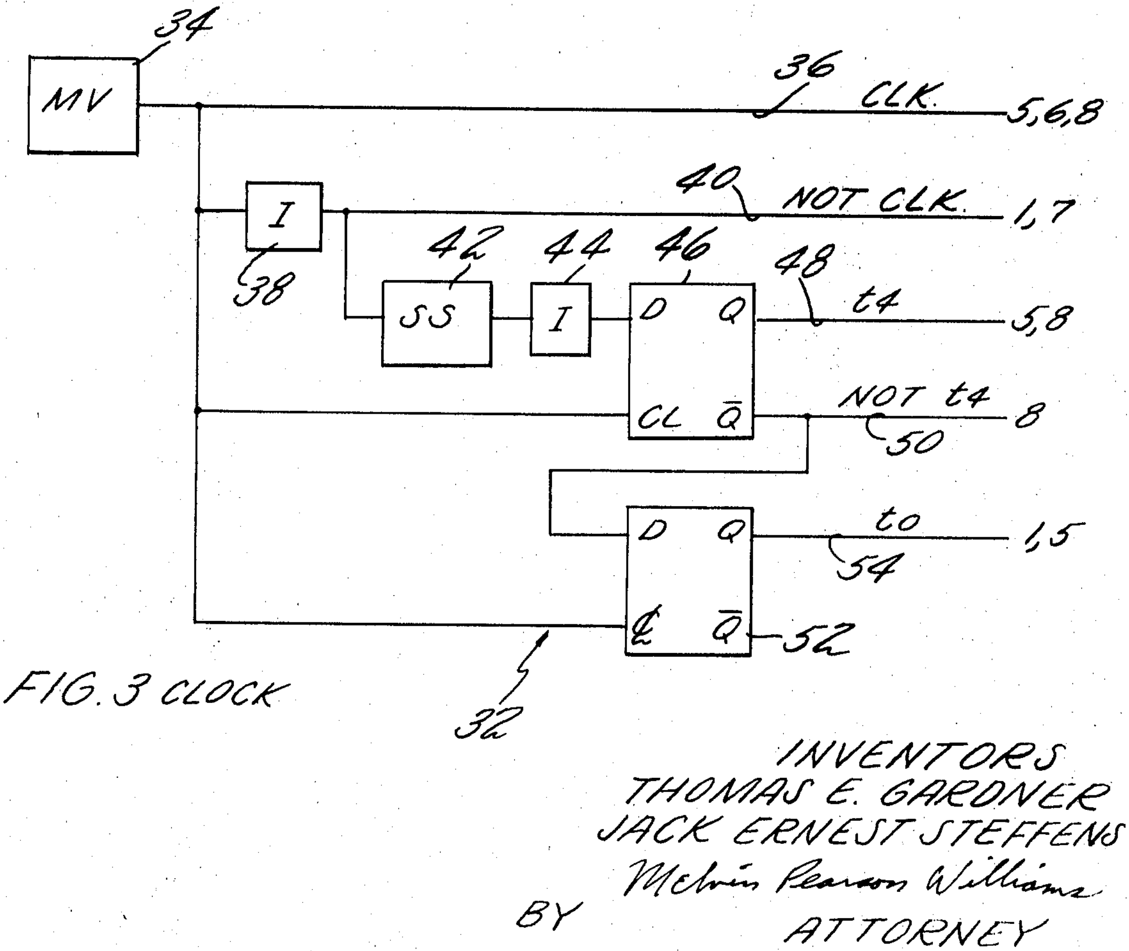
FIG. 3 CLOCK
INVENTORS
THOMAS E. GARDNER
JACK ERNEST STEFFENS
BY Melvin Pearson Williams
ATTORNEY FIG. 4 CLOCK & RESET TIMING
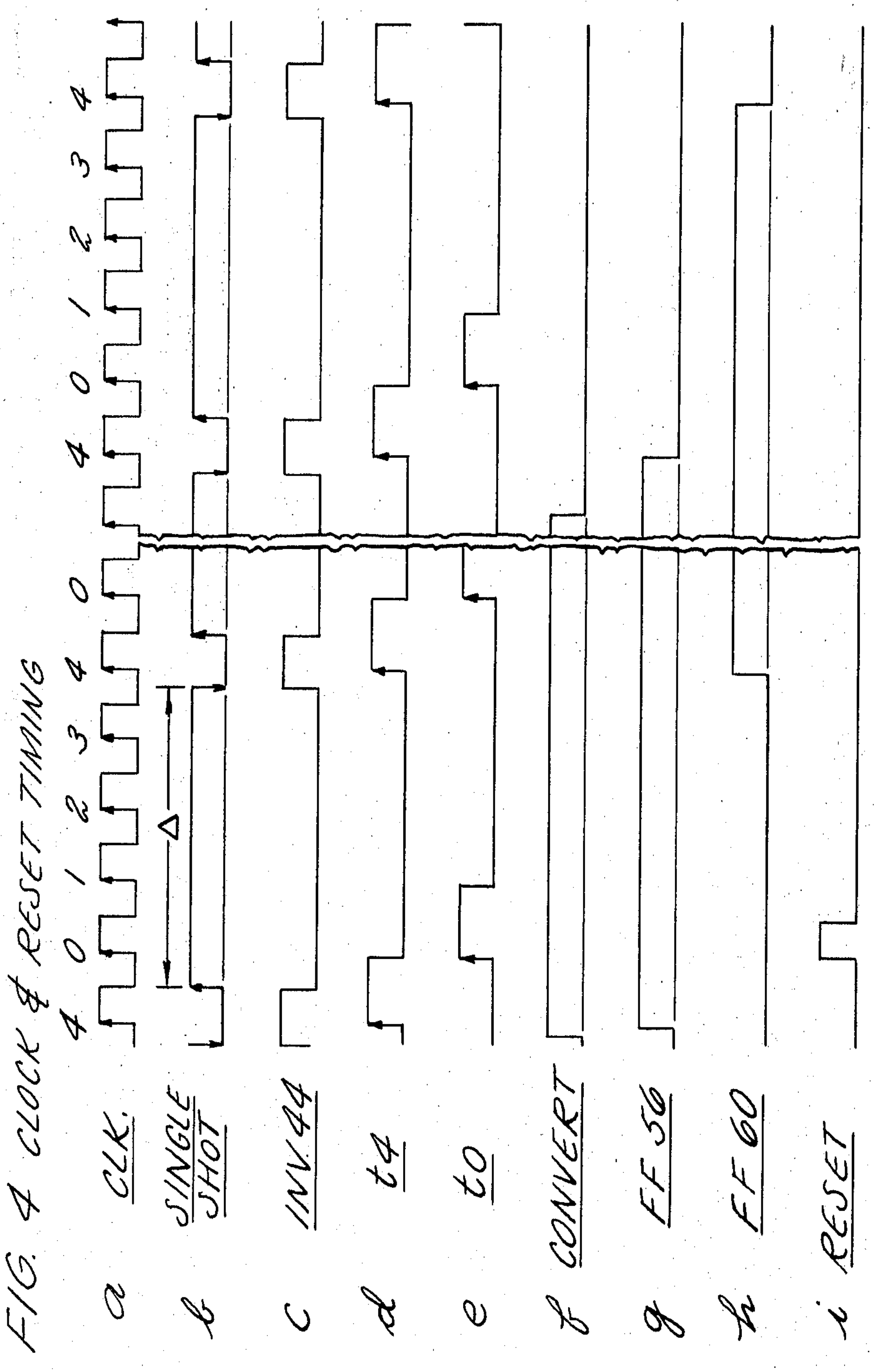

SERIAL ANALOG TO DIGITAL CONVERTER

BACKGROUND OF THE INVENTION

1. Field of Invention

This invention relates to data processing, and more particularly to serial analog-to-digital conversions employing successive approximation.

2. Description of the Prior Art

In many data handling applications, the need arises to convert analog information to digital information. One well-known method of performing such conversion, known as successive approximation, utilizes a digital data register which can be forced to reflect various digital values, and the output of the register is passed through a digital-to-analog converter. The analog equivalent of the sample (or test) digital data may be compared in a voltage comparator against the incoming analog data. The comparison is made one binary bit at a time, starting with the highest order bit. Since the highest order bit represents half of the total value which is storable in the digital register, the first test will determine whether the analog value is equal to, greater or less than half of the representable digital value. Thus, with a ONE stored in the highest order bit, and the remaining bits set to ZERO, the content of the register is converted to an analog value which is compared against the input analog value. If the input analog value is equal to, or greater than the digital value, then the highest order bit of the final digital value will be a ONE. On the other hand, if the input analog value is less than the analog, representation of the digital value, the final digital value will have a ZERO in the highest ordered position; this means that the analog value is less than one-half of the total representable digital value. With the proper results in the highest ordered bit, the second highest ordered bit is then set to a ONE and the content of the register is again passed through a digital-to-analog converter for comparison with the input analog value. This, in effect, determines whether the analog value is greater, equal to, or less than the three-fourths (or one-fourth, in the case where the first test resulted in a ZERO) of the total representable digital value. In a similar fashion, results are stored in the proper high order positions and a ONE is forced into a next lower order position and the content of the digital register is converted to an analog voltage and a comparison takes place. Thus, by starting at the high order, the digital value is successively tested and, as a result of the tests or comparison, the analog signal is successively approximated in the digital register.

Apparatus heretofore available for the performance of successive approximation analog-to-digital conversions have required the use of duplicate registers. One register is used for data storage and the other register is used to count the iterations involved in the successive approximation method. Apparatus known to the art also requires extremely complex encoding circuitry for testing each successive bit in the iteration. Additionally, most devices known to the art present the digital data in parallel form. Other devices present the data in serial form during the conversion process, which is cumbersome to handle and inherently requires presenting the data high order bit first. For computation purposes, particularly where arithmetic is involved, it is inherently advantageous to have serial data available low order bit first.

As the needs of the aerospace industry become more complex, the trend is toward utilization of digital computation implemented in integrated circuit form, in order to save weight in aerospace vehicles. As is known, a normal commercial passenger aircraft requires an overall increase in gross weight of about 6 pounds, for every pound of hardware added to the plane, in order to accommodate the additional fuel and thrust required to handle the pound of hardware weight. Thus the penalties for weight are severe in the aerospace industry, and the need for simplicity of data handling hardware is paramount.

SUMMARY OF INVENTION

The object of the present invention is to provide a simplified analog-to-digital conversion apparatus.

According to the present invention, the working register in a successive approximation digital-to-analog converter comprises a shift register which utilizes a data test bit as a control bit. In accordance further with the present invention, the same test bit is repetitively cycled for successive approximation comparison with the input data. According to the invention further, the highest order position of the shift register may be set in response to a lowest order bit or a next to lowest order bit of the register, or in response to the result of a test comparison with the analog input data. In further accord with the present invention, the simplified controls permit alteration of operating conditions in response to data bits appearing in given positions of the shift register and in response to a specific time signal. In accordance still further with the present invention, entry of a test word at the start of the operation suffices for the testing of each order of representable digital data; it further provides data entry control. Clocking is reduced to anonymous bit timing clock signals (that is, a clock bit in time 2 is not identified as such), and one specific time signal.

The present invention greatly simplifies the hardware required for digital-to-analog successive approximation conversions. The needs, not only for full scale timing control registers, but also for complex interconnecting logic circuitry between timing and data registers, are both eliminated herewith.

The foregoing and other objects, features and advantages of the present invention will become more apparent in the light of the following detailed description of preferred embodiments thereof, as illustrated in the accompanying drawing.

DESCRIPTION OF THE DRAWING

FIG. 1 is a schematic block diagram of a system incorporating the present invention;

FIG. 3 is a schematic block diagram of a typical CLOCK circuit for incorporation in the system of FIG. 1;

FIG. 4 is a timing diagram illustrating the timing of the CLOCK circuit of FIG. 3 and the RESET CIRCUIT of FIG. 5;

DESCRIPTION OF THE PREFERRED EMBODIMENTS

Figure 2:
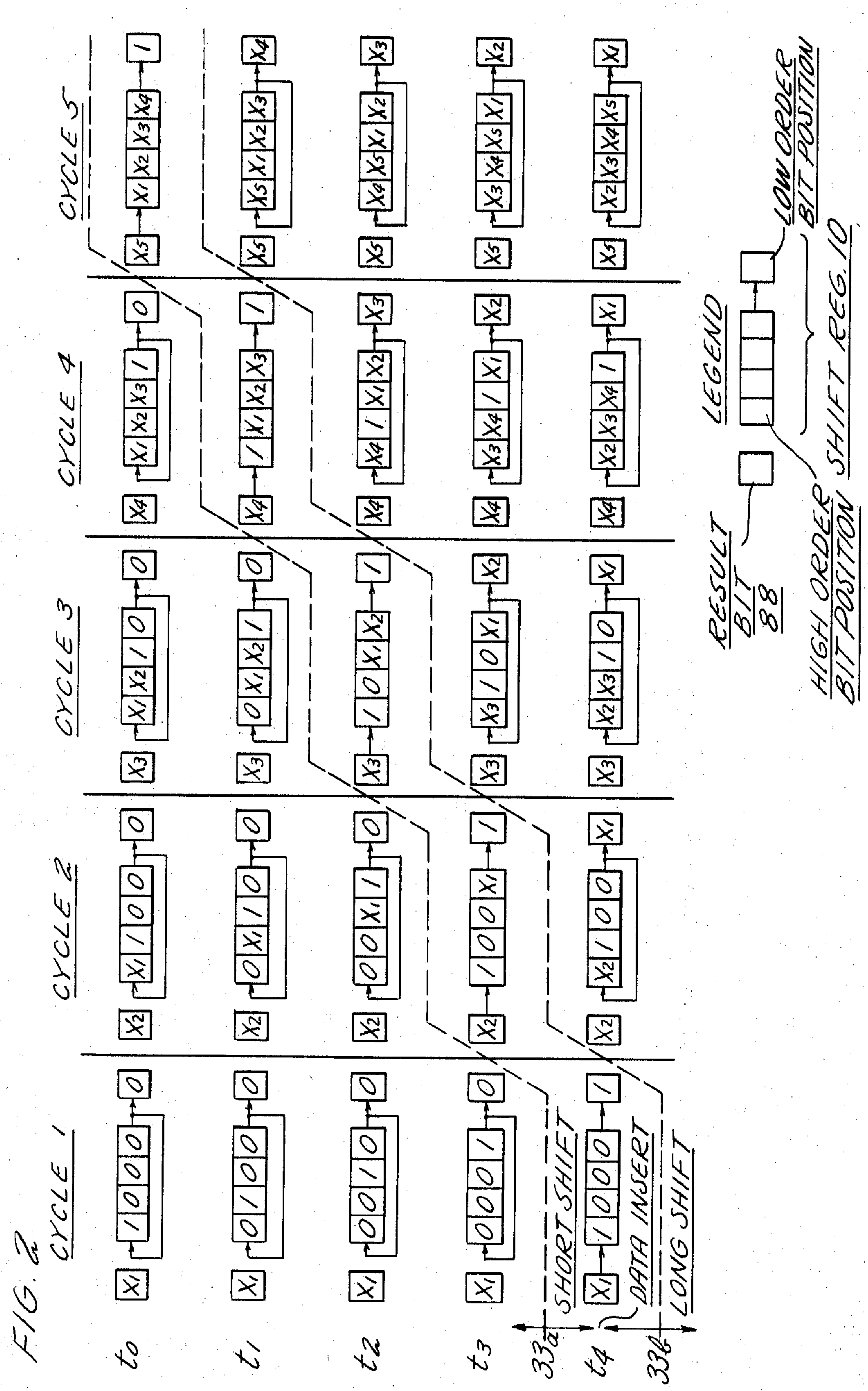
FIG. 2 is a schematicized illustration of successive iterations in the apparatus of the present invention.

Referring now to FIG. 1, a typical embodiment of the present invention employs a SHIFT REG (register) 10, as shown for example as comprising five bits (bits 0—4). The lowest ordered bit is Bit 0, and the highest ordered bit is Bit 4. All five stages of shift register 10 are connected by a trunk of five lines 12 to corresponding GATES 14 which permit the data to flow over another trunk of five lines 16 to a conventional D/A (digital-to-analog) converter 18. The output of the D/A converter 18 is applied to one input of an analog COMPARE circuit 20, the other input of which comprises Analog INPUT DATA on a line 22. The result of the COMPARE circuit 20 is applied over a line 21 to a RESULT REG (register) 24 the output of the RESULT REG 24 is applied to a DATA IN (input) circuit 26, which, when appropriate, will insert data into the high order bit (Bit 4) of the SHIFT REG 10. The RESULT REG 24 and the DATA IN circuit 26 are under the control of a SHIFT CTRL (control) circuit 28 which provides the basic operating modes of the system of the present invention. In addition, a START circuit 30, which recognizes the start of an operation in response to a CONVERT command on a line 31 and a CLOCK circuit 32 provide various controls to the overall system.

For an understanding of the operation of the invention, reference is made to both FIG. 1 and FIG. 2. As described hereinbefore, the first step in a successive approximation conversion begins with the SHIFT REG 10 set to all ZERO's except for the highest ordered bit, (Bit 4). This is illustrated (FIG. 2) in CYCLE 1, time *t*0. When operation is established, (at time *t*4) a reset signal indicates the beginning of an overall iteration (including, in the example herein, the five CYCLES illustrated in FIG. 2); once that is established, the next time (*t*0) will force the setting of the register to 10,000, as indicated in cycle 1, *t*0. The content of the SHIFT REG 10 is then gated through the GATES 14 and the D/A converter 18 into the COMPARE circuit 20 for comparison with the ANALOG INPUT DATA. As described hereinbefore, if the ANALOG INPUT DATA is greater than the analog equivalent of the digital value 10,000, then the RESULT REG is set to a ONE. On the other hand, if the ANALOG INPUT DATA is less than the analog equivalent of 10,000, the result register is set to a ZERO. The result register is set in time *t*0, and this result will remain unused in the register for a variable length of time (compare cycles 1—4) until the word in the SHIFT REG 10 has cycled to a point where the comparison result should be entered, as becomes more apparent in the following description.

In the embodiments of the present invention herein disclosed, the logic employed may comprise integrated circuits of a well-known variety available on the open market. In particular, the storage circuitry (the flip-flops) used herein change state at leading edges (ZERO to ONE transition) of signals rather than responding to signal levels. Thus, transitions from one state to another occur at the leading edge of the timing signals and therefore the data content of the shift register is changed at the leading edge of successive clock signals. This means that it changes at the beginning of a given period of time within the cycle. Therefore, at the start of time *t*1, the data in the SHIFT REG 10 has been shifted one bit to the right as indicated in FIG. 2 under CYCLE 1, time *t*1. Similarly, at the start of time *t*2 and again at the time start of time *t*3 the content of the register is again shifted one bit to the right. Notice that a short shift is employed, wherein the next to lowest order position (Bit 1) if the register is being transferred into the high order position (Bit 4) of the register by an endround shift. At the same time, the data is also shifted into the lowest order position (Bit 0) of the shift register. At time *t*3 of CYCLE 1, the short shift connections are still operative so that, at the start of time *t*4 the test bit (the ONE) is shifted from the next to the lowest order position of the register into the lowest order position and into the high order position. Thus, the test bit has circulated completely through the shift register, and because of the duality of connection, it has also been reentered into the high order position of the shift register. It should be noted that the ONE which was forced into the register at time *t*0 of CYCLE 1 is the test bit used for successive approximation; and this same test bit is cycled around and used over and over again for the successive orders of testing against the analog data. Note also, that because of the fact that all of the positions of the register except the highest order were initially set to ZERO, the appearance of the ONE bit (the test bit) in the lowest ordered position (Bit 0) can be used as a control indication that the next shift will permit entry of result data into the highest order position of the register. This is one of the features of the present invention which permits simplified control circuitry.

Referring now, in FIG. 2, to CYCLE 2, at the start of time *t*0, the GATES 14 are opened to pass the content of the shift register through the D/A converter 18 to the COMPARE circuit 20, and the result is set in the RESULT REG 24. Also, data is again shifted one position to the right in the SHIFT REG 10 and since the connections were set up during time *t*4 of cycle 1 to connect the RESULT REG 24 to the high order position of the SHIFT REG 10, as the remaining data is shifted one bit to the right, the result bit (X1) is shifted into the high order position of the SHIFT REG 10. During time *t*0, the connections are then made for a short shift so that, at the start of time *t*1, the next to lowest order position of the SHIFT REG 10 (Bit 1) is shifted both into the lowest order position and into the highest order position of the register; this action repeats at time *t*2, and again at time *t*3. When the test bit again appears (time *t*3, CYCLE 2) in the low order position of the register, the short shift controls are dropped, and connection is made to enable transferring the content of the RESULT REG 24 (X2) into the high order position of the register. Notice that, at this time, the first result (X1) is in the second lowest order position (Bit 1) of the shift register. It is therefore in a position to again become the highest order bit of the data as cycling continues. However, this cannot occur in the next time period (time *t*4 of CYCLE 2) because this is the time when the result for the second iteration (X2) will be entered into the highest order position. This is where the long shift comes in, which permits transferring the highest order data bit (X1) from the second lowest order position (Bit 1) into the lowest order position (Bit 0), at the same time as the next highest data result (X2) is entered into the highest order position of the SHIFT REG 10 (at the start of time *t*4, CYCLE 2). During time *t*4, CYCLE 2, the connections are enabled for a long shift, so that at the start of time *t*0 of CYCLE 3, X1 is shifted from the lowest order position of the register into the highest order position of the register, and all the other bits of the register are shifted one position to the right.

As in the previous cycles, during time *t*0 of CYCLE 3, the GATES 14 are enabled so that the data in the SHIFT REG 10 is transferred to the D/A converter 18 and the COMPARE circuit 20. The result of the comparison (a ONE, if the analog input data is higher than the digital data, and otherwise a ZERO) is stored in the result register in time *t*0, and once again connections are made to proceed with short shifts so that data in the next to lowest order position of the register can be transferred into the highest order position and into the lowest order position of the register at the start of time *t*1, and again at the start of time *t*2. At the start of time *t*2 in CYCLE 3, the test bit has again appeared in the lowest order position as well as in the highest order position of the register. The presence of the test bit in the lowest order position causes the connections to be changed so that at the start of the next cycle, the content of the RESULT REG 24 will be moved into the highest order position of the register, as all of the other bits are shifted one bit to the right. Note again how the same test bit continues to cycle around and is moved jointly into the lowest order position, for use as a control bit, and into the highest order position, so that it will again be available in continuing iterations as a test bit. Note also that the short shift connections cause the position of the test bit to advance by one position for each successive test iteration. During time *t*2 of CYCLE 3, the connections are made to enter the third result bit (X3) into the highest order position, while all remaining bits shift one bit to the right (the test bit in the lowest order position being lost as a result of the shift). This occurs at the start of time *t*3 in CYCLE 3, during which period of time connections are maintained for a long shift so that once again the data can be shifted one position to the right. At the start of time *t*4, the third result (X3) has moved into the second highest order position, the second result (X2) is in the highest order position, and the first result (X1) is in the lowest order position. During this time, the connections are maintained for one additional long shift which takes place at the start of time *t*0 in CYCLE 4.

At the start of time *t0* in CYCLE 4, the final long shift for the third iteration is made in preparation of the fourth iteration. This results in all of the result bits (X1—X3) appearing in their proper order in the shift register so that during time *t0* of CYCLE 4, the data can again be passed through the GATES 14, the D/A converter 18, and the COMPARE circuit 20 for comparison with the ANALOG INPUT DATA. In time *t0*, the result of this comparison is set into the RESULT REG 24. During time *t0* of CYCLE 4, the connections are made for a short shift to permit moving the test bit into both the highest order position and the lowest order position of the register. Thus one shift will occur, at the start of time *t1* in CYCLE 4, which again places the test bit in the lowest order position, and indicates a change in control so that the fourth result (X4) can be entered into the highest order position of the register at the start of the next time period.

At the leading edge of time *t2* of CYCLE 4, the fourth result (X4) is moved from the RESULT REG 24 into the highest order position of the SHIFT REG 10, and all of the other data bits are shifted one position to the right. During times *t3* and *t4* the data is shifted two positions within the register with long shifts. The occurrence of the test bit in the next to lowest order position during time *t4* is a special control indication meaning that the iteration will be complete when one more cycle plus one more shift have taken place. This signal causes the turn on of an iteration completion trigger, so that during the start of CYCLE 5, only long shifts are made.

At the start of *t0*, CYCLE 5, the test bit is in the low order position of the register and so a compare again can be made, the same as in time *t0* of each of the other cycles. Thus the GATES 14 are open to pass the data through the D/A converter 18 to the COMPARE circuit 20 and a result will be stored in the RESULT REG 24 during time *t0*. During this period, since the test bit has been shifted into the lowest order position, the controls are set up for so that, on the next cycle, the last result (X5) may be entered into the highest order position, as the test bit is long by being shifted out of the lowest order position, and the other bits of data are shifted one position to the right. Thus, at the start of time *t1* in CYCLE 5, the data in the RESULT REG 24 is shifted into the highest order position and all the other bits of data are moved one position to the right, the test bit being lost.

Because of the fact that, during time *t4* of CYCLE 4, the test bit appeared in the next to low order position of the register, the completion controls (part of the SHIFT CTRL 28) indicated that completion of conversion about to begin, and this thereafter causes the connections to remain made for long shifts. Thus the data will continue to cycle around the shift register one time period after the next, perpetually, until such time as a new command to begin conversions (CONVERT, FIG. 1) is received by the START circuit 30. This makes the date continuously available, and at each time *t0*, the data is in the proper order for reading out. Thus the commencement of a serial data readout may begin at time *t0*, and the bits can be read out low order first.

Note in the above description that the initial setting of the shift register to 10,000 is all that is required to provide both the test bit for all successive iterations and the control bit to identify the point in successive portions of the iteration when result data can be inserted. Also note that the test bit, by being cycled successively through the shift register, functions as a test bit for each successive order in the successive approximation conversion iteration. In addition, the test bit, by its appearance in the lowest order position serves as an indication that data may be entered during the next shift, at the start of the next time period. Furthermore, note that in all but CYCLE 5 the low order position serves both as a control register (for recognizing the test bit), as well as an extra bit in the data chain to permit cycling the data in the proper order while redundant zero's are removed by being shifted out of the low order position following the test operation (during time *t0* of each of the cycles). It is these features of the present invention which permit extremely simple control and the elimination of the iteration counting registers and complex logic circuitry which attend digital-to-analog converters known to the art.

It can be noticed in FIG. 2 that two dashed lines 33*a*, 33*b* divide the operation into short shift periods (above line 33*a*), long shift periods (below the line 33*b*) and data insertion periods (between the lines 33*a* and 33*b*).

Note that the content of the next to low order position is the same at *t0* of any cycle and at *t4* (or *tn*) of the same cycle. The control functions may be timed accordingly if desired.

The foregoing description in conjunction with FIG. 2 is given in terms of five digital binary data bits, which result in a shift register five bits long and five time periods (*t0*—*t4*).

It should be understood, however, that a system on *n* bits may be utilized provided that *n* periods and a shift register having *n* positions are provided. For instance, for 16-digital data bits, a 16-bit shift register and time periods *t0*—*t15* would be required.

Note that a four-bit word is available at the start of Cycle 5: if desired, this can be taken as the output by ignoring the test bit in the lowest order position.

Referring now to FIG. 3, a typical CLOCK circuit which may be utilized with the present invention is illustrated. In FIG. 3, the CLOCK 32 may respond to a multivibrator 34, the output of which comprises the clock signal (CLK) on a line 36. By means of an inverter 38, the complement of the clock signal (NOT CLK) is provided on a line 40. The clock and not clock signals represent the first and second halves, respectively of each of the time periods *t0*, *t1*, *t2* etc. This is shown in illustration (*a*) of FIG. 4. The present invention does not require knowledge of any particular clock signal except for the first signal (*t0*) and the last signal (*t4*), of what may be considered a word time, and what is described in FIG. 2 as a cycle. Alternatively, in a system of *n* bits, a specific clock signal (equivalent to *t4*) generated once for every *n*th clocking signal will suffice. The function of *t0* is satisfied by selecting a clocking signal next following the specific clock signal. Therefore, there is no need to have a timing ring or timing register as has been required in the prior art. Instead, a single shot 42 or some other equivalent form of delay circuit may be utilized to operate an inverter 44 which in turn will enable the data input (D) of a flip-flop 46. This flip-flop is of a well-known variety, called a D-type flip-flop, which has four inputs and two outputs. The D input is a data input; the C input is a clock input; whenever a leading edge of a signal of a given polarity (for instance, the rising edge of a positive wave form when the flip-flop is of a particular configuration) will cause the flip-flop to assume a state in dependence upon the level the voltage level at the D input. In addition, the circuit may be forced into either the SET state of the RESET state by application of, for instance, a positive signal on the S or R inputs, respectively. When the flip-flop is set, there will be a positive signal on the Q output; when the flip-flop is reset there is a positive signal on the $\overline{Q}$ output. Once a signal enters the single shot 42, successive not clock signals will have no effect on the single shot until it times out. When it times out, the falling edge of its output will cause operation of the inverter 44. This in turn enables the trigger 46 so that at the rise of the next clock signal the trigger will become set and provide a signal on its in-phase output (Q) on a line 48. This signal is referred to as *t4*. The out-of-phase signal ($\overline{Q}$) of the flip-flop 46 comprises the complementary signal called NOT *t4* on a line 50. This signal is applied to the data input of a flip-flop 52 so that, on the next succeeding clock signal, the flip-flop 52 will become set, generating a signal on a line 54 which defines time *t0*. This is shown in illustrations *b*, *c*, *d* and *e* of FIG. 4. In FIG. 4, note that the arrowheads are an indication that the setting of the triggers occurs in response to the rise of the clock signals. The delay period of the single shot multivibrator 42 (indicated as a delta in illustration *b* of FIG. 4) can vary in the present embodiment from four time periods to four and one-half time periods without altering the operation of the invention, since it is gated with the following clock signal at the inputs to the flip-flop 46.

Instead of utilizing the clock circuit of FIG. 3, the system in accordance with the present invention, as shown in FIG. 1, may operate entirely upon clock signals provided by a digital computer for which the conversion is being made. The computer will provide a word signal equivalent to time *t*4; thereafter the word signal equivalent to time *t*4 will be utilized to generate a signal equivalent to time *t*0, in the same fashion as shown, in FIG. 3. The important thing to note is that the timing requirements of the system are not only simple, but are the same regardless of the number of digital bits involved. Thus, even if a 32-bit digital shift register were utilized, all that would be required for timing would be the CONVERT command signal (to begin the conversion process), the clocking signals, and a word signal equivalent to the last of the time periods (taken in this example to be *t*4), which would be *t*31 in the case of a 32-bit digital word. Then one additional time signal, *t*0, is generated by circuitry herein.

As described with respect to FIG. 2 hereinbefore, the system herein will respond to a command CONVERT and thereafter will proceed through its iterations until a complete set of digital data is generated, and will continue circulating the digital data until the next time that a CONVERT command signal is received. Of course, this could be modified in accordance with well-known teachings of the art, if desired in any given implementation of the present invention. But it does illustrate the simplicity of controls in a system employing the present invention. The response to the command to begin a conversion operation is received on the line 31 in the START circuit 30, which is illustrated in detail in FIG. 5. This provides an enabling level for the D input of a flip-flop 56, the clock input of which is connected to the *t*4 signal line 48. As shown in illustrations *f* and *g* of FIG. 4, at the rise of the next *t*4 signal following the appearance of the CONVERT signal, the flip-flop 56 will become set and will supply an input over a signal line 58 to another flip-flop 60. The flip-flop 60 also has its clock input connected to the *t*4 signal line 48, so that, on the next succeeding rise of the *t*4 signal, it too will become set as shown in illustration *h* of FIG. 4. Between the time that flip-flop 56 is set and flip-flop 60 is set there is an input from the in-phase output of flip-flop 56 and from the out-of-phase output of flip-flop 60 to an AND circuit 62, which also has an input from the *t*0 signal line 54 and from the clock line 36. Thus, in the time period (*t*0) immediately following the period *t*4 when flip-flop 56 is set, the AND circuit 62 will be enabled at the rise of the clock signal 36 thereby generating a START signal as shown in illustration *i* of FIG. 4. The START signal is connected by a line 64 to various parts of the circuitry to be described hereinafter. Basically, it causes the shift register 10 to assume the 10,000 data configuration, causes the shift control to establish a short shift and resets the last cycle flip-flop, all described in more detail hereinafter.

Figures 5, 6, 7:
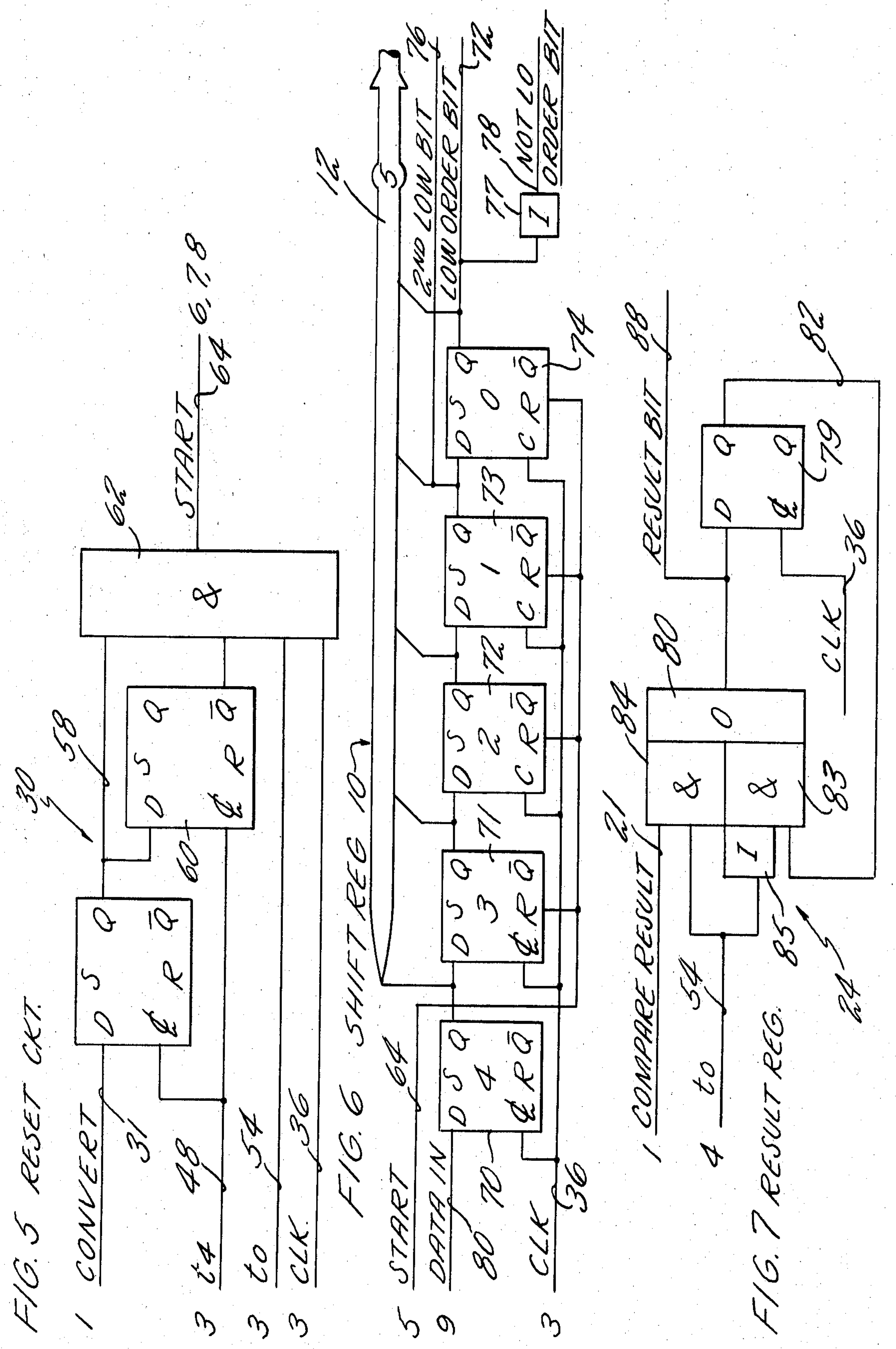
FIG. 5 is a schematic block diagram of a START circuit for incorporation in the embodiment of the invention illustrated in FIG. 1.
FIG. 6 is a schematic block diagram of a typical SHIFT REGISTER which may be employed in the embodiment of the invention illustrated in FIG. 1.
FIG. 7 is a schematic block diagram of a RESULT REGISTER which may be employed in the embodiment of the invention illustrated in FIG. 1.

Referring now to FIG. 6, a typical shift register, as connected for use in the embodiment of the invention shown in FIG. 1, may employ a plurality of D-type flip-flops 40—44. As seen in FIG. 6, a START signal on the line 64 will cause the highest order flip-flop 70 to be set, and the four low order flip-flops 71—74 to be reset. This occurs just prior to commencement of time *t*0 to CYCLE 1 of a conversion iteration. In addition, each of the flip-flops 71—74 is clocked by a signal on the clock line 36. The flip-flop 70 of the highest ordered position (Bit 4) receives a DATA IN signal over a line 80, which may represent data in the next to lowest order position, data in the lowest order position, or data from the result register, in dependence upon operation of the invention as described with respect to FIG. 2 hereinbefore, and is more fully described with respect to the DATA IN circuit 26 with respect to FIG. 9 hereinafter. Each of the in-phase outputs (Q) of each of the four high order stages (70—73) is connected to the data input (D) of the next stage in the sequence (71—74, respectively). In addition, the in-phase output (Q) of each stage (70—74) is passed over the trunk of five lines 12 to the GATES 14 (FIG. 1) in order to pass data in the register through the D/A converter 18 to the COMPARE circuit 20. The output of the lowest order position (Bit 0) flip-flop 74 is defined as the LO ORDER BIT and is connected by a line 75 to various parts of the system for control and data purposes. Similarly, the next to lowest order position (Bit 1) flip-flop 73 has its in-phase output applied over a line 76 for data and control purposes, and is herein referred to as 2nd LO BIT. The utilization of these signals is described with respect to detailed circuitry hereinafter.

The RESULT REG 24 as shown in FIG. 7 comprises a D-type flip-flop 79. The enabling input level to the data input of the flip-flop 79 is provided by an OR circuit 80. The OR circuit 80 has, as inputs, two AND circuits 83, 84. During time *t*0, AND circuit 83 is enabled on input line 54 while AND circuit 83 is disabled through the invertor circuit 85. Thus, the COMPARE RESULT signal on line 21 will pass through AND circuit 84 and OR circuit 80 to appear on the RESULT BIT output 88 and at the data input to flip-flop 79. As previously described, the COMPARE RESULT signal 21 now present at the data input to the flip-flop 79 is the state that this flip-flop will assume at the next positive transition of the clock (this is at time *t*1). At all times other than *t*0, the line 54 is low, which disables AND circuit 84 and through invertor 85 enables AND circuit 83. A feedback line 82 connects the output of flip-flop 79 to its data input thru the enabled AND circuit 83 and OR circuit 80. Thus, the result of the last comparison, which at time *t*1 is stored in the flip-flop 79, is recirculated until the next comparison at time *t*0.

Figures 8, 9:
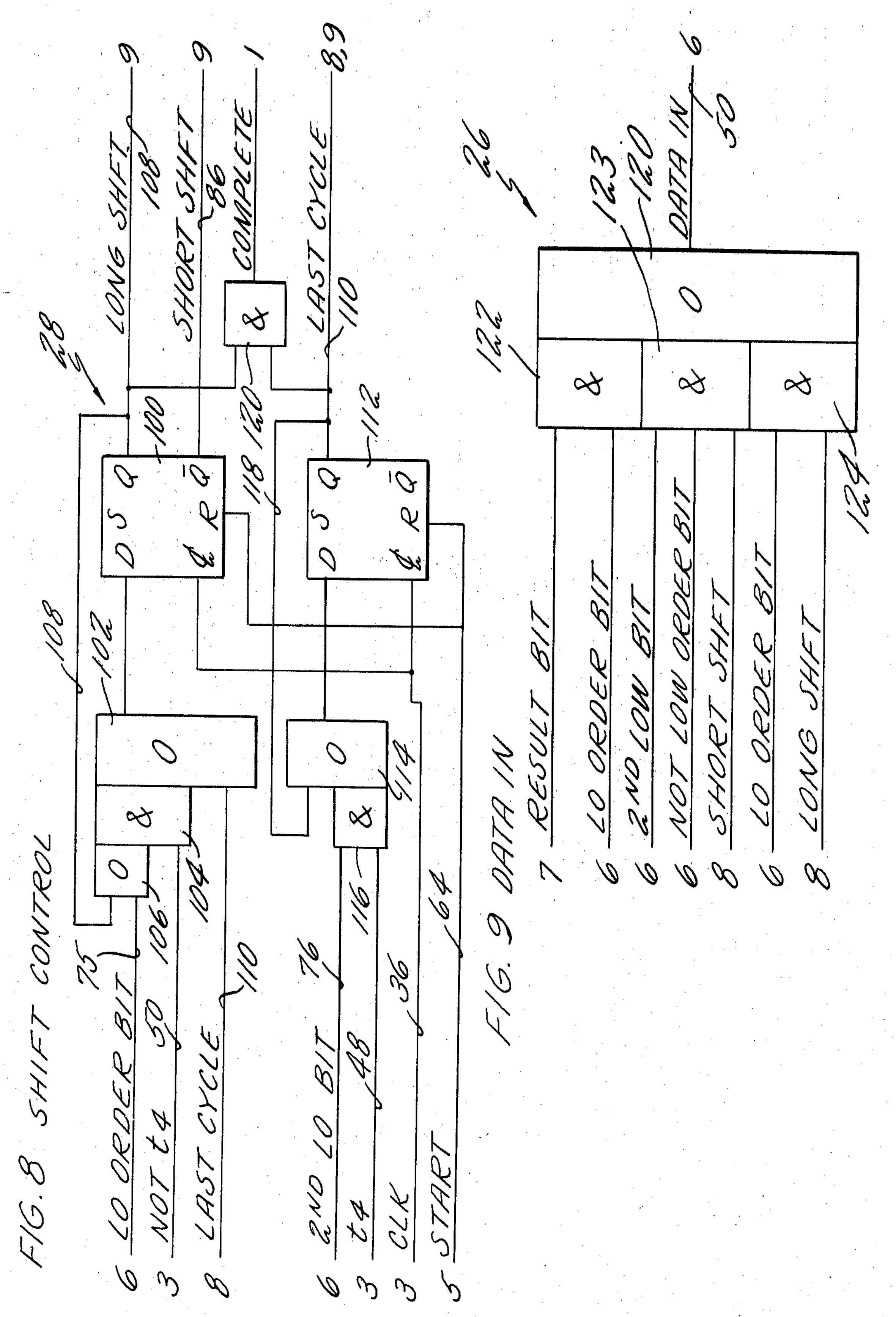
FIG. 8 is a schematic block diagram of a SHIFT CONTROL in accordance with the present invention.
FIG. 9 is a schematic block diagram of a DATA IN circuit in accordance with the present invention.

Referring now to FIG. 8, the shift control 28 provides indications of short shift and long shift as well as an indication of when the conversion operation is completing. The shift control itself comprises a D-type flip-flop 100, the data input of which is enabled by an OR circuit 102. The OR circuit 102 can respond to an AND circuit 104 at any time except during *t*4 due to the presence of a signal on the NOT *t*4 line 50. The AND circuit 104 is enabled by an OR circuit 106 either in response to a feedback line 108 from the in-phase output (Q) of the flip-flop 100, or by a signal indicating the presence of a LO ORDER BIT in the shift register 10 on the line 75. Thus at other than time *t*4, the flip-flop 100 can be set to indicate a long shift in response to the presence of a low order bit, and is regenerated to indicate a long shift until *t*4. At time *t*4, the input on line 50 to AND circuit 104 disappears, so that at the next appearance of the clock signal on the line 36 the flip-flop 100 will not reset since there is no enabling signal at the data input thereto. On the other hand, when conversion is nearly completed, as indicated by a signal on a LAST CYCLE line 110, the OR circuit 102 will continuously cause the enabling of the data input of the flip-flop 100 so that it will remain in the long shift state until the LAST CYCLE signal 110 disappears as a result of the commencement of another conversion operation as indicated by a signal on the RESET line 64, as described in the following paragraph. The LAST CYCLE signal on line 110 is generated by the in-phase output Q of a flip-flop 112 the data input of which is enabled by an OR circuit 114. The OR circuit in turn responds to an AND circuit 116 which has an input indicating time period *t*4 on the line 48, and also responds to a signal indicating a ONE present in a second lowest order bit (2nd LO BIT) on the line 76. This is to identify the last time period of the next-to-last cycle (CYCLE 4 in the example given in FIG. 2), since ZERO test bits always appear in the next to lowest order position (Bit 1) of the shift register during time period *t*4 until the next-to-last cycle, at which time the test bit of ONE appears in that position at time *t*4. Once the flip-flop 112 is set, then a feedback path 118 continuously enables it until it is forced to reset by the appearance of the START signal on the line 64 at the start of a conversion operation. Thus, the establishment of the LAST CYCLE signal in FIG. 8 will permit continuously recycling the data in the long shift operation due to the effect of the OR circuit 102 as described briefly hereinbefore.

The effect of selective insertion result register data, low order bit data, or second to low order bit data into the high order position of the shift register 10 (FIG. 1) is controlled by the DATA IN circuitry shown in FIG. 9. Therein, the DATA IN signal is generated on line 50 by an OR circuit 120 in response to any one of four AND circuits 122—125. In terms of function, AND circuit 122 is used to insert comparison result data from the result register to the high order bit of the shift register 10 at the rise of the next clock time following the appearance of a ONE in the low order bit of the shift register 10. The AND circuit 123 has the function of inserting data into the high order bit of the shift register 10 in response to the second lowest order bit of the shift register 10 during the short shift operation except during the time period when the actual data insertion takes place (which periods are times *t*4 of CYCLE 1, *t*3 of CYCLE 2, *t*2 of CYCLE 3, *t*1 of CYCLE 4 and *t*0 of CYCLE 5). The AND circuit 124 inserts data from the lowest order bit register 10 during a long shift. As described heretobefore, the convert complete signal 110 forces the shift control flip-flop 100 to remain in its long shift state so that AND circuit 124 remains enabled thus recirculating the data in the shift register 10. Thus the AND circuit 124 is operative during those time periods which fall below the dashed lines of FIG. 2, after a conversion has been completed.

The AND circuit 125 takes over from the AND circuit 124 after time period *t*0 of CYCLE 5, once the conversion operation is completing as indicated by a signal on the LAST CYCLE line 110. This keeps the data cycling from the low order bit into the high order bit of the register cycle after cycle until another conversion operation is started by the receipt of a CONVERT instruction on line 31 (FIG. 1).

Once completion of the conversion operation is indicated, and a signal appears on the COMPLETE line 110, an AND circuit 120 (FIG. 1) will gate successive bits of data through it at each not clock time, the not clock being utilized as a gating signal to allow the shift register to firmly establish data in shifted positions before being read through the AND circuit 120. The data is in correct order beginning at time *t*0 of each cycle following cycle 5, and can be recognized by a computer or other utilization apparatus in any fashion suitable to the utilization apparatus.

Although the invention has been shown and described with respect to the preferred embodiments thereof, it should be understood by those skilled in the art that various changes and omissions in the form and detail thereof may be made therein without departing from the spirit and the scope of the invention.

We claim:

1. In a successive approximation analog-to-digital converter having a digital-to-analog converter with its output connected to a comparison circuit for comparison with analog input data to provide a comparison result, the improvement comprising:

a shift register capable of shifting data content from high order to low order; and means for establishing an initial test pattern in said register, for advancing the content of said register including said test pattern, for controlling the comparison of the content of said register with said analog input data, and for inserting said comparison result into a given position of said register.

2. In a successive approximation analog-to-digital converter for providing a digital result, having a digital-to-analog converter with its output connected to a comparison circuit for comparison with analog input data, including means for manifesting comparison results, the improvement comprising:

a shift register;

means for initially setting said shift register with a test bit of ONE in its highest order position and ZERO's in all remaining positions;

clocking means providing a plurality of clocking signals for advancing data through said shift register and providing a specific clock signal once for every *n* clocking signals, where *n* is related to the number of bits of the digital result;

means operative in timed relation with said specific clock signal for causing a comparison of at least the content of said shift register with said analog input data; and means responsive to the presence of said test bit in a given position of said shift register for inserting the comparison result manifestation into a position of given order in said shift register.

3. In a successive approximation analog-to-digital converter having a digital-to-analog converter with its output connected to a comparison circuit for comparison with analog input data to provide a comparison result, the improvement comprising:

register means including means to manifest comparison results;

means for initially setting said register means with a test bit of ONE in its highest order position and with ZERO's in a group of lower ordered positions;

clocking means providing a plurality of clocking signals for advancing data in said high order position and said group from high order to low order in said register means and for providing a specific clock signal cyclically, successive ones of said specific clock signals being interspersed with a given number of said clocking signals;

means operative in timed relation with said specific clock signals for causing a comparison of the data content of at least a portion of said register means with said analog input data; and means responsive to the presence of said test bit in a given position of said register means for inserting the comparison result manifestation into a position of given order said register means.

4. The converter according to claim 1 wherein said last named means comprises shift control means settable into either one of two stable states, said means when set in a first stable state controlling the insertion of data into the highest order position of said register means in response to the next to lowest order position of said register means and when set in the other of said stable states controlling the insertion of data into the highest order position of said register means in response to the lowest order position of said register means.

5. The converter according to claim 2 wherein said last named means comprises shift control means settable into either one of two stable states, said means when set in a first stable state controlling the insertion of data into the highest order position of said register means in response to the next to lowest order position of said register means and when set in the other of said stable states controlling the insertion of data into the highest order position of said register means in response to the lowest order position of said register means.

6. The converter according to claim 3 wherein said last named means comprises shift control means settable into either one of two stable states, said means when set in a first stable state controlling the insertion of data into the highest order position of said register means in response to the next to lowest order position of said register means and when set in the other of said stable states controlling the insertion of data into the highest order position of said register means in response to the lowest order position of said register means.

7. The converter according to claim 5 wherein said shift control means is changed from said first state to said second state in response to the presence of said test bit in a given position of said register.

8. The converter according to claim 6 wherein said shift control means is changed from said first state to said second state in response to the presence of said test bit in a given position of said register.

9. The converter according to claim 5 wherein said shift control means is changed from said second state to said first state in response to said specific clock signal.

10. The converter according to claim 6 wherein said shift control means is changed from said second state to said first state in response to said specific clock signal.

11. The converter according to claim 2 additionally comprising completion means settable into a generating state jointly in response to said test manifestation in a given order of said shift register in timed relationship with one of said specific clock signals for generating a last cycle signal indicative of impending completion of a conversion operation.

12. The converter according to claim 3 additionally comprising completion means settable into a generating state jointly in response to said test manifestation in a given order of said shift register in timed relationship with one of said specific clock signals for generating a last cycle signal indicative of impending completion of a conversion operation.

13 In a successive approximation analog-to-digital converter having a digital-to-analog converter with its output connected to a comparison circuit for comparison with analog input data, the improvement comprising:

clock signal means for presenting a sequence of clocking period signals, including means presenting a specific clock signal cyclically, successive ones of said specific clock signals being presented in timed relationship with each $n$th clocking signal;

a shift register having $n$ data manifesting positions, the data content of said shift register being advanced one position in response to each of said clocking signals;

start means for generating a start signal manifesting the initiation of a conversion operation during a clocking signal next following one of said specific clock signals;

control means settable into either one of two stable states, said means generating a first control signal in a first one of said states and generating a second control signal in the other of said states, said control means responsive to said start signal for setting into said first state;

means for setting the data content of said shift register with a test manifestation of a proper data significance for the first comparison of a successive approximation iteration; and data insertion means responsive to the presence of said test manifestation in the lowest order position of said shift register to enter the data content of the result manifesting means into the highest order position of said shift register.

14. In a successive approximation analog-to-digital converter having a digital-to-analog converter with its output connected to a comparison circuit for comparison with analog input data including means for manifesting comparison results, the improvement comprising:

clock signal means for presenting a sequence of clocking period signals, including means presenting a specific clock signal cyclically, successive ones of said specific clock signals being presented in timed relationship with each $n$th clocking signal;

a shift register having $n$ data manifesting positions, the data content of said shift register being advanced one position in response each of said clocking signals;

start means for generating a start signal manifesting the initiation of a conversion operation during a clocking signal next following one of said specific clock signals;

control means settable into either one of two stable states, said means generating a first control signal in a first one of said states and generating a second control signal in the other of said states, said control means responsive to said start signal for setting into said first state;

means responsive to said start signal for setting the data content of the highest order position of said shift register with a test manifestation of a first data significance and for setting the other positions of said shift register with manifestations of data significance different from that of said test manifestation;

control setting means responsive to said second control signal or the presence of said test manifestation in the lowest order position of said shift register concurrently with the absence of said specific clock signal to set said control means into said second state, and otherwise to set said control means into said first state, once for each clocking signal; and data insertion means responsive to the presence of said test manifestation in the lowest order position of said shift register to enter the data content of the result manifesting means into the highest order position of said shift register, said data insertion means responsive to said first control signal to enter the data content of the next to lowest order position of said shift register into the highest order position of said shift register, said data insertion means responsive to said second control signal to enter the data content of the lowest order position of said shift register into the highest order position of said shift register.

15. The converter according to claim 14 additionally comprising completion means settable into a generating state jointly in response to said test manifestation in the next to lowest order of said shift register concurrently with one of said specific clock signals for generating a last cycle signal indicative of impending completion of a conversion operation, said completion means responsive to said start signal to be reset into a nongenerating state, said completion means, once set in said generating state, generating said last cycle signal in every clocking period until reset.

16. The converter according to claim 15 wherein said control setting means is responsive to said last cycle signal to set said control means into said second state.